(12) United States Patent
Bohner et al.

(10) Patent No.: US 6,323,763 B1
(45) Date of Patent: Nov. 27, 2001

(54) STEERING SYSTEM FOR MOTOR VEHICLES

(75) Inventors: Hubert Bohner, Boeblingen; Rainer Freitag, Owen; Martin Moser, Fellbach; Reinhold Schneckenburger, Rutesheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/351,338

(22) Filed: Jul. 12, 1999

(30) Foreign Application Priority Data

Jul. 10, 1998 (DE) ............................................. 198 31 071

(51) Int. Cl.⁷ ....................................................... B60Q 1/00
(52) U.S. Cl. ......................... 340/436; 340/435; 340/465; 340/576; 340/903
(58) Field of Search .................................. 340/436, 435, 340/437, 403, 465, 576, 903; 180/282, 404, 446, 447; 701/36, 301, 41, 42, 43, 44

(56) References Cited

U.S. PATENT DOCUMENTS

| | | | |
|---|---|---|---|
| 5,097,917 | * 3/1992 | Serizawa et al. | 340/465 |
| 5,253,728 | * 10/1993 | Matsuno et al. | 180/140 |
| 5,667,033 | * 9/1997 | Shimizu et al. | 340/904 |
| 5,762,160 | * 6/1998 | Shimizu | 180/446 |
| 5,907,277 | * 5/1999 | Tokunaga | 340/441 |
| 6,082,482 | * 7/2000 | Kato et al. | 180/402 |
| 6,097,286 | * 8/2000 | Discenzo | 340/465 |
| 6,101,435 | * 8/2000 | Baughn et al. | 701/41 |
| 6,131,059 | * 10/2000 | Kaji et al. | 701/41 |
| 6,134,491 | * 10/2000 | Kawagoe et al. | 701/43 |

FOREIGN PATENT DOCUMENTS

| | | |
|---|---|---|
| 0738647 A2 | 10/1996 | (EP). |
| 2-271278 | 11/1990 | (JP). |
| 3-276872 | 12/1991 | (JP). |
| 4-19274 | 1/1992 | (JP). |
| 5-18541 | 7/1993 | (JP). |
| 5-294250 | 11/1993 | (JP). |
| 6-68397 | 3/1994 | (JP). |
| 7-10007 | 1/1995 | (JP). |
| 7-125643 | 5/1995 | (JP). |
| 7-144560 | 6/1995 | (JP). |
| 8-150955 | 6/1996 | (JP). |
| 8-268287 | 10/1996 | (JP). |
| 8-310422 | 11/1996 | (JP). |
| 9-221052 | 8/1997 | (JP). |
| 10-21499 | 1/1998 | (JP). |
| 10-45015 | 2/1998 | (JP). |
| 10-67301 | 3/1998 | (JP). |

* cited by examiner

*Primary Examiner*—Jeffery Hofsass
*Assistant Examiner*—Hung Nguyen
(74) *Attorney, Agent, or Firm*—Crowell & Moring LLP

(57) ABSTRACT

A steering system for motor vehicles, has a steering handle, for example steering handwheel, capable of being operated by the driver. A steering actuating drive provides for the steering adjustment of steerable vehicle wheels. A steering-angle desired-value encoder is capable of being operated by the steering handle, and a steering-angle actual-value encoder operates via the steerable vehicle wheels. A regulating and control arrangement operates the steering actuating drive as a function of a comparison of the desired and actual values of the steering angle. The risk of a collision between a vehicle equipped with the steering system and an obstacle is reduced, and the steering system is suitable for steer-by-wire operation by equipping the steering system with collision prevention apparatus which determine steering angles (collision steering angles) making a collision possible between the motor vehicle and an obstacle. The regulating and control arrangement hinders or prevents the setting of a desired steering angle coinciding with one of the collision angles.

18 Claims, 1 Drawing Sheet

STEERING SYSTEM FOR MOTOR VEHICLES

BACKGROUND OF THE INVENTION

This application claims the priority of German application 198 31 071.4, filed in Germany on Jul. 10, 1998, the disclosure of which is expressly incorporated by reference herein.

The invention relates to a steering system for motor vehicles, a steering handle, for example, steering handwheel, capable of being operated by the driver, a steering actuating drive for the steering adjustment of steerable vehicle wheels, with a steering-angle desired-value encoder capable of being operated by the steering handle, a steering-angle actual-value encoder capable of being operated by the steerable vehicle wheels, and a regulating and control arrangement operating the steering actuating drive as a function of a comparison of the desired and actual values of the steering angle.

A steering system of the foregoing type may be designed, in particular, for steer-by-wire operation, in which, where appropriate, a mechanical steering column, customary in conventional steering systems, can be replaced by another mechanical system or else by a hydraulic system, in particular a hydrostatic system.

Car manufacturers are making great efforts, based on various concepts, to increase vehicle safety and, consequently, the safety of vehicle occupants. According to one of these concepts, measures are indicated, by means of which, for example, the risk of collision of the vehicle with an obstacle is reduced. Collisions of this kind may occur, for example, when, if a first vehicle changes lane, a second vehicle is in the so-called "blind spot" of the first vehicle. Collisions when the vehicle is being manoeuvred are less serious, but are all the more frequent. Also, the fear of collisions, for example when the vehicle is being parked, often means that, when parking spaces are tight, drivers often do not even attempt to park the vehicle.

Electronic parking aids are known for manoeuvring the vehicle. These aids generate an acoustic signal, and warn the driver, on the basis of range-measuring sensor technology, when a critical distance between the vehicle and an obstacle is reached. At higher speeds, parking aids of this type are unsuitable for avoiding collisions, for example during a change of lane.

EP 0,738,647 A2 discloses a conventional power steering system with a rigid steering column which has a servomotor for assisting a manual steering force exerted by the driver. Moreover, the known power steering system has means for deciding whether there is the possibility of a collision between the vehicle and an obstacle detected in the steering direction. When the risk of a collision is detected in the known power steering system, there is a reduction in the power assistance, so that a collision course can be controlled only by increased manual steering force. At the same time, in order to avoid a collision, the known power steering system may work as sluggishly as a conventional power steering system in which the power assistance has failed.

The collision avoidance principle used in the known power steering system can be applied, however, only to a steering system having a rigid steering column. It is not possible to use it in a steering system which works by steer-by-wire operation or in a steering system with an open steering column, that is to say a steering system without a rigid steering column, for example a steering system with a hydraulic rod, a steering column with couplings, planetary assemblies or other gearings which interrupt the rigid drive-through from the steering wheel to the steered wheels. This is because, in steering systems of this type without a rigid coupling between the steering handle and the steered wheels, such a reduction in the power assistance would not be noticed on the steering handwheel by the driver. Thus, if lateral wheel forces act on the steered wheels, changes in direction of travel which can no longer be controlled by the driver may occur.

SUMMARY OF THE INVENTION

An object of the present invention is to provide a steering system in which a risk of collision between a vehicle equipped with it and an obstacle is reduced, while, at the same time, the steering system is to continue to be suitable for steer-by-wire operation.

This problem has been solved according to the present invention by providing a steering system comprising a steering handle arranged to be operated by a vehicle driver, a steering actuating drive operatively arranged for steering adjustment of steerable vehicle wheels, a steering-angle desired-value encoder operatively associated with the steering handle; a steering-angle actual-value encoder operatively associated with the steerable vehicle wheels; a regulating and control arrangement arranged to operate the steering actuating drive as a function of a comparison of desired and actual values of the steering angle; and a collision prevention apparatus, configured to determine steering angles defining a collision path between the motor vehicle and an obstacle, wherein the regulating and control arrangement is operatively arranged to hinder or prevent the setting of a desired steering angle coinciding with one of the collision steering angles.

The invention is based on the general recognition of acting on the steering system such that the driver is hindered or even prevented from setting a desired steering angle coinciding with a collision steering angle. With the aid of this measure, faulty steering manoeuvres leading to collisions are intercepted or reduced as early as on the desired-value side of the steering system, and the actual-value side of the steering system can remain unchanged.

In particular, the steering actuating drive can transmit the same high stabilizing actuating forces to the steerable vehicle wheels. When the setting of a desired steering angle coinciding with one of the collision angles is hindered or prevented, it follows from the unchanged dependence of the actual steering angle on the desired steering angle that an actual steering angle coinciding with one of the collision steering angles also can be set only with difficulty, or not at all. Thereby, in actual fact, a collision course of the vehicle with a detected obstacle is impeded or avoided.

Since the actual-value side of the steering system is unchanged, for example, lateral forces acting on the steerable vehicle wheels cannot cause any uncontrolled steering manoeuvre. The steering system according to the invention is therefore particularly suitable for steer-by-wire operation.

Moreover, the invention provides that the regulating and control arrangement is configured to operate the steering actuating drive to prevent an actual steering angle from coinciding with one of the collision steering angles.

The invention is also based on the recognition, particularly in a steering system working by steer-by-wire operation, that the dependence of the actual steering angle on the desired steering angle is modified, to the effect that an actual steering angle predetermined by a desired steering angle is set only as long as the set actual steering angle does not correspond to one of the detected collision steering angles.

Desired steering angles exceeding the desired steering angle are then ignored. This measure also results in the effective prevention of a collision between the vehicle and a detected obstacle. Since, in this system too, the actuating forces for steering the steerable vehicle wheels are unchanged, uncontrolled steering movements cannot occur, in this embodiment either, in the event of lateral forces acting on the steerable vehicle wheels, as a result of which this steering system, too, can be used with steer-by-wire operation.

While this solution gives the steering system or the vehicle priority over the driver's wishes, the above-mentioned solution adopts a different approach and leaves ultimate control over the vehicle to the driver.

Particularly in a development of the first-mentioned embodiment of the steering system according to the invention, countersteering apparatus can be provided. Thereby, the steering handle capable of being operated by the driver can be subjected to a countersteering force which counteracts the steering force exerted on the steering handle by the driver. The countersteering apparatus contemplated by the present invention can hinder the setting of a desired steering angle coinciding with one of the collision angles, as long as the countersteering force generated by the steering handle is lower than the steering force exerted on the said steering handle by the driver, it can even prevent such setting, if the countersteering force generated by the steering handle is equal to or higher than the steering force exerted by the driver.

In order to exert the countersteering force, the countersteering apparatus may be provided with a brake and/or with an electric motor. Each of these components is coupled to the steering handle or to a steering train connected to the steering handle in order to generate the corresponding countersteering forces on the steering handle.

Preferably, in the case of a steering system working by steer-by-wire operation, a manual force controller can be provided in order to improve the driver's driving sensation. The manual-force controller is operated by the regulating and control arrangement for simulating lateral forces acting on the steering wheels and is coupled to the steering handle, in particular via a steering train, in order to transmit reduced simulated wheel forces to the steering handle. Consequently, the driver is given the sensation of the current road condition and the vehicle driving state.

A manual-force controller of the foregoing type can serve, in the steering system according to the present invention, as countersteering apparatus and generate the desired countersteering forces. In such a steering system, therefore, the collision prevention measures according to the invention can be implemented without any appreciable constructional outlay.

In advantageous embodiments of the steering system according to the invention, acoustic and/or optical and/or haptic apparatuses which are operated by the regulating and control arrangement can be provided to generate an acoustic or optical or haptic signal for the driver in response to an attempt to set a steering angle coinciding with a collision angle. In addition, with the aid of a warning signal of this kind, the driver's attention can be attracted and a corresponding reaction brought about.

In an embodiment which generates a haptic signal in order to warn the driver, this haptic warning signal may take the form of an oscillation or vibration which is perceptible on the steering handle, in particular on the steering handwheel. In this embodiment, the haptic signal may be generated, for example, by the above-mentioned manual-force controller or the above-mentioned countersteering apparatus. These oscillations or vibrations may be superposed on the driver's steering movement, while, according to an expedient embodiment, these oscillations and vibrations superposed on the steering angle at the steering handwheel are filtered out when the steering actuating drive is operated as a function of the desired steering angle, so that these oscillations and vibrations are not transmitted to the steerable vehicle wheels.

Whereas the above-mentioned embodiments referred essentially to the situation where the driver intends to steer the vehicle in the direction which will probably result in a collision, the following embodiments also take into account driving situations in which the vehicle is already on a collision course at the moment when an obstacle is detected.

According to an advantageous embodiment of the steering system according to the present invention, if the actual steering angle coincides with one of the collision angles the regulating and control arrangement can carry out a steering action by operating the steering actuating drive correspondingly, in order to set a steering angle not coinciding with one of the collision steering angles. This steering action is capable of taking place independently of the desired steering angle. Thereby, collisions can be effectively prevented, particularly when the vehicle is being manoeuvred.

In an expedient embodiment of the above-mentioned invention, the steering action independent of the desired steering angle can be carried out as a function of the current driving state of the vehicle, and corresponding apparatus for detecting the current driving state is provided. For example, a steering action of this kind is expedient during slow vehicle movements, in order to prevent a collision with an obstacle located at a short distance from the vehicle. In contrast to this, the regulating and control arrangement may be programmed in such a way that a steering action does not take place at higher speeds.

In a further advantageous embodiment of the steering system according to the invention, the regulating and control arrangement can carry out a braking action and/or an engine action and/or a gearing action and/or a suspension action as a function of the current driving state. For example, a vehicle which has begun to swerve at relatively high speed can be stabilized considerably better by a controlled action on the engine power, the suspension and the metered individual-wheel braking of the vehicle than by controlled steering action.

Other objects, advantages and novel features of the present invention will become apparent from the following detailed description of the invention when considered in conjunction with the accompanying drawings.

BRIEF DESCRIPTION OF THE DRAWINGS

The sole FIGURE shows a basic schematic illustration of a steering system according to the present invention which is suitable for steer-by-wire operation.

DETAILED DESCRIPTION OF THE DRAWINGS

Figure 1:
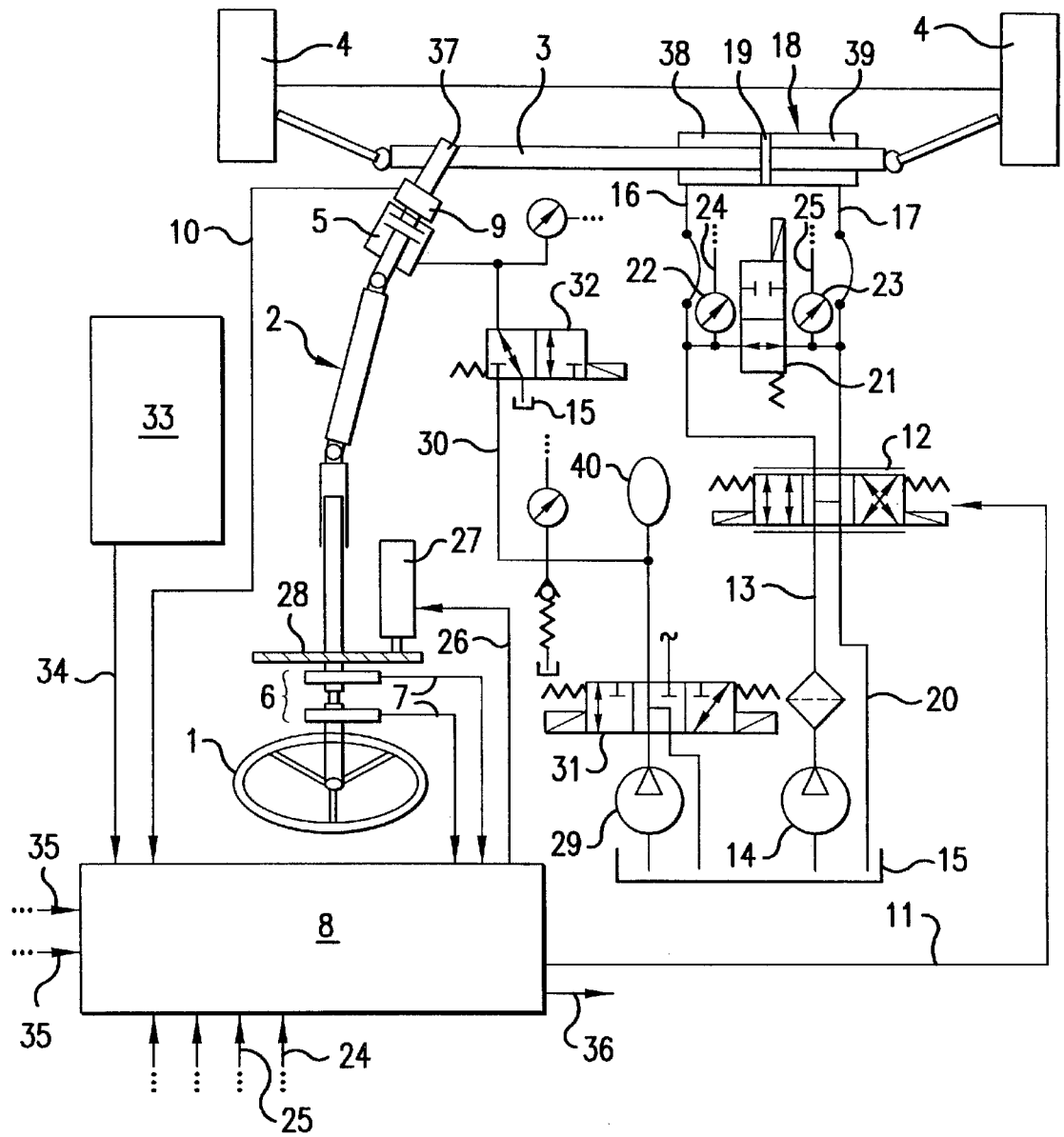

A steering system according to the invention is shown in the sole figure and has a steering handle, e.g. a steering handwheel 201, on which a vehicle driver acts in order to introduce a steering force manually into the steering system. The steering handwheel 1 is rotationally fixed to a steering train 2 which, at its end facing away from the steering handwheel 1, meshes via a pinion 37 with a steering rod 3. This steering rod 3 serves for steering steerable vehicle wheels 4 of a steerable axle of the vehicle.

A hydraulic coupling 5 is arranged in the steering train 2 so that, when the steering system is operating normally, the coupling 5 is open and consequently uncouples the steering handwheel 1 from the steering rod 3. The steering system illustrated, when operating normally, therefore works on the steer-by-wire principle.

For the steering system to work by steer-by-wire operation, a steering-angle desired-value encoder 6, which is capable of being actuated by the steering handwheel 1, is arranged in the steering train 2. The steering-angle desired-value encoder 6 generates signal values which are correlated with the desired steering angle required in each case. These signal values are transmitted via corresponding signal lines 7 to a central regulating and control arrangement 8 of the steering system. This regulating and control arrangement 8 is preferably computer-assisted and contains memories as well as programs, filed in these memories, for operating the steering system.

A steering-angle actual-value encoder 9 is arranged at a suitable point, here at that end of the steering train 2 which is assigned to the steering rod 3, to detect the current steering angle of the vehicle wheels 4 and communicate a signal value correlated therewith to the regulating and control arrangement 8 via a corresponding signal line 10.

By a comparison of the desired and actual values of the steering angle, the regulating and control arrangement 8 determines a control or regulating signal which is transmitted via a corresponding control line 11 to a proportional control valve 12. As a result, the control valve 12 switched in a suitable way. The sole figure illustrates the initial position of the control valve 12 which the latter assumes when, for example, the supply of current to the steering system is interrupted.

The control valve 12 connects a pressure line 13 so that hydraulic medium is sucked out of a hydraulic-medium reservoir 15 via a hydraulic-medium pump 14, to connections 16, 17 of a steering actuating drive 18. Depending on the desired steering direction, one or the other connection 16, 17 is subjected to more pressure than the other. In the illustrated embodiment, the steering actuating drive 18 is configured as a double-acting piston/cylinder assembly having a piston 19 coupled to the steering rod 3. Thereby, an adjusting movement of the piston 19 brings about a steering movement of the vehicle wheels 4 via the steering rod 3.

In the steering actuating drive 18, two chambers 38, 39 are separated from one another by the piston 19. One of these chambers communicates with the connection 16, and the other chamber communicates with the connection 17. The pressure difference between the chambers 38, 39 causes movement of the piston. That connection 16 or 17 of the steering actuating drive 18 which is connected in each case to the chamber 38 or 39 having the lower pressure is connected, via the control valve 12, to a return line 20 which returns the hydraulic medium displaced in the steering actuating drive 18 into the hydraulic-medium reservoir 15.

A safety valve 21 is arranged between the connections 16, 17 of the steering actuating drive 18 and, in an emergency, short-circuits the connections 16, 17 in order to prevent the steering from being locked as a result of a hydraulic shut-off of the steering actuating drive 18. In the illustrated embodiment, the safety valve 21 is in the emergency position. When the steering system is operating normally, however, the safety valve 21 assumes its other position, in which the connections 16, 17 are not connected to one another via the safety valve 21. Even here, the safety valve 21 automatically assumes its emergency position such as, for example, the occurrence of a power failure.

The connections 16, 17 communicate with pressure sensors 22, 23 which measure the current hydraulic-medium pressure in the respective connections 16, 17 and, consequently, in the respective chambers 38, 39 of the steering actuating drive 18 which communicate therewith. Signal values correlated with the pressure values are transmitted to the regulating and control arrangement 8 via corresponding signal lines 24, 25.

In addition to the above-described control signal for operating the control valve 12 and, consequently, for operating the steering actuating drive 18, the regulating and control arrangement 8 also sends a further control signal, via a corresponding control line 26, to a manual-force controller 27. The latter is configured as, for example, an electric motor and is coupled to the steering train 2 via a gearing such as, for example, a disc 28. So that the driver operating the steering handwheel, is given the sensation of lateral forces on the vehicle wheels 4 and therefore the sensation of the vehicle driving behavior, the manual-force controller 27 simulates a counterforce which counteracts the driver's steering force and which is transmitted to the steering handwheel 1 via the disc 28 and the steering train 2. This measure gives the driver the impression of steering against resistance, as in a conventional steering system.

Furthermore, the driving sensation or the road sensation can be improved even further via the manual-force controller 27. If lateral forces acting on the vehicle wheels 4 due, for example to road unevenness, generate pressure fluctuations in the chambers 38, 39 of the steering actuating drive 18 and consequently at the respective connections 16, 17, these pressure fluctuations are detected by the pressure sensors 22, 23 and are transmitted via the signal lines 24 and 25 to the regulating and control arrangement 8. There, corresponding control signals for the manual-force controller 27 are calculated, so that the lateral forces triggered by, for example, ground unevenness and acting on the vehicle wheels 4 can also be simulated on the steering handwheel 1. These lateral forces can be perceived at the handwheel 1 by the driver, even though, when the steering system is working by steer-by-wire operation, the steering handwheel 1 is per se uncoupled from the movements of the vehicle wheels 4 due to the open coupling 5.

In order to activate the steer-by-wire operation of the steering system, the coupling 5 is subjected to a hydraulic pressure generated by a second hydraulic-medium pump 29 which otherwise serves to, for example, generate a hydraulic pressure for a levelling device of the vehicle. Here, when an accumulator charging valve 31 is appropriately switched and a coupling switching valve 32 is appropriately switched, the delivery side of the hydraulic-medium pump 29 is hydraulically connected to the coupling 5 via a pressure line 30. When a corresponding hydraulic switching pressure prevails at the coupling 5, the latter opens and thereby uncouples the steering rod 3 from the steering handle 1.

In an emergency such as, for example when the electrics of the steering system break down, the coupling switching valve 32 assumes the position illustrated in FIG. 1. The coupling 5 is then connected to the hydraulic-medium reservoir 15, so that the switching pressure in the coupling 5 breaks down. At the same time, the coupling 5 closes and, via the steering train 2, connects the steering rod 3 to the steering handle 1, so that the steering forces exerted on the steering handle 1 can be transmitted directly to the steering rod 3.

The accumulator charging valve 31 is also configured to be fail-safe. In order to charge a pressure accumulator 40 of the coupling system, the accumulator charging valve 31 is adjusted to the right from the illustrated mid-position. In order to charge a corresponding pressure accumulator (not illustrated) of the levelling device, the accumulator valve 31 is adjusted correspondingly to the left. In an emergency, the accumulator valve 31 can be switched to a currentless position, so that it automatically assumes the illustrated mid-position, in which the switching pressure in the coupling 5 breaks down.

The steering system according to the present invention has, moreover, apparatus 33 for preventing a collision of the vehicle with an obstacle. This apparatus can comprise, for example, distance sensors and the like for detecting the position of an obstacle in relation to the external dimensions of the vehicle. In the illustrated embodiment, the collision prevention apparatus 33 transmit the relative coordinates of a detected obstacle in relation to the vehicle to the regulating and control arrangement 8 via a corresponding signal line 34.

Moreover, via corresponding signal inputs 35, the regulating and control arrangement 8 has available the necessary information on the current driving state of the vehicle, such as, for example, its speed. With the current actual steering angle, the regulating and control arrangement 8 can then calculate, from the determined relative position of the obstacle, a range of steering angles which may lead to a collision between the vehicle and the obstacle if they are set at the vehicle wheels 4. The functioning of the collision prevention apparatus according to the present invention will now be explained. A first vehicle equipped with the steering system according to the present invention travels in the right-hand lane of a road which has two lanes in the direction of travel. A second vehicle in the left-hand lane approaches the first vehicle at insignificantly higher speed until it disappears in the blind spot of the first vehicle travelling in the right-hand lane. The driver of the first vehicle then wishes to overtake a third vehicle travelling in front of him, and at the same time overlooks the second vehicle located in the blind spot and attempts to begin changing lanes.

Even while the second vehicle has been approaching, however, the distance sensors of the collision prevention apparatus 33 have detected it as a potential obstacle and determined corresponding collision steering angles. These collision steering angles are constantly updated for every change in the relative position between the first and second vehicle.

In order to prevent a collision between the vehicles, the regulating and control arrangement 8, at the latest when the attempt is made to steer towards the second vehicle, generates a countersteering force via the manual-force controller 27 and hinders the driver from setting a collision steering angle on the steering handwheel 1.

In another embodiment which adopts a different design approach, the counterforce generated by the manual-force controller 27 can be so high that the steering handwheel 1 cannot be rotated at all in the direction in which the regulating and control arrangement 8 expects a collision. In both approaches, therefore, the setting of a desired steering angle at which there is risk of a collision is prevented or hindered.

It is also within the contemplation of the present invention to allow the steering handwheel 1 to rotate in the direction in which there is a risk of collision. The regulating and control arrangement 8, is, however, then not converting this rotation into a corresponding operating signal for the steering actuating drive 18. In contrast to the above-described embodiments, a desired steering angle at which there is the risk of collision may be set, but is not converted into a critical actual steering angle by the regulating and control arrangement 8.

The steering system according to the invention can be further improved with the aid of additional measures. For example, the regulating and control arrangement 8 can evaluate the available signal values in order to establish whether the vehicle is to be maneuvered. In this case, for example, other, in particular shorter distances between the vehicle and a detected obstacle, may be considered critical, than is the case, for example, when the vehicle speed is high. Moreover, there can be provision, when a specific distance limit value is reached, for activating a vehicle brake via a corresponding signal line 36, in order to stop the vehicle even before a collision.

The regulating and control arrangement 8 can also be configured to detect, for example, swerving of the vehicle and carry out a braking action on individual wheels as well as an action on the engine power, an action on the suspension system and an action on the gearing of the vehicle to regain control over the vehicle which has begun to swerve, for example on black ice.

It is clear that in situations which have such complexity, the regulating and control arrangement 8 of the steering system cooperates, or is at least partially integrated into, an on-board computer of the vehicle.

Moreover, in advantageous embodiments, in addition to hindering the operation of the steering handle 1 in the "wrong" direction, a vibration can be transmitted to the steering handwheel 1 via the manual-force controller 27, so that the driver receives a haptic warning signal. Furthermore, a signal lamp or a horn can be activated to warn the driver and/or other road users.

Due to mechanical uncoupling between the steering handle 1 and the steerable vehicle wheels 4 in a steer-by-wire system, this system may also be designed in such a way that it executes steering maneuvers automatically. For example, parking in relatively narrow parking spaces could take place automatically thereby. There may also be provision for the steering system to execute an avoidance maneuver automatically, with correspondingly comprehensive range-measuring or distance-measuring instruments then being necessary. Instead of carrying out the steering maneuvers automatically, the system can urgently recommend a steering maneuver by, for example acoustic signal messages.

On a so-called emergency level of the steer-by-wire system, i.e., when the steering handle 1 is coupled to the steerable vehicle wheels 4 via the mechanical steering tain 2, with the coupling 5 closed, the steering actuating drive 8 can serve as a servomotor. On this emergency level, therefore conventional power steering is available to a greater or lesser extent. Similarly, the manual-force controller 27 can also be used as a servomotor for assisting the forces exerted on the steering handle 1 by the driver.

For collision prevention, the servomotors (steering actuating drive 18 or manual-force controller 27), working alternately or jointly, can then assist to a lesser extent, or even block, the driver's steering movements in a direction which will probably lead to a collision with an obstacle. The setting of a collision angle is thereby hindered or prevented. Furthermore, on this emergency level, the servomotors 18 or 27 can be activated via the regulating and control arrangement 8, so that countersteering forces counteracting the driver's steering force are transmitted to the steering train 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering system for motor vehicles, comprising:
   a steering handle arranged to be operated by a vehicle driver;
   a steering actuating drive operatively arranged for steering adjustment of steerable vehicle wheels, with a steering-angle desired-value encoder operatively associated with the steering handle;
   a steering-angle actual-value encoder operatively associated with the steerable vehicle wheels;
   a regulating and control arrangement arranged to operate the steering actuating drive as a function of a comparison of desired and actual values of the steering angle; and
   a collision prevention apparatus, configured to determine steering angles defining a collision path between the motor vehicle and an obstacle,
   wherein the regulating and control arrangement is operatively arranged to hinder or prevent the setting of a desired steering angle coinciding with one of the collision steering angles and the steering system is operatively configured to effect a steer-by-wire operation.

2. The steering system according claim 1, wherein the regulating and control arrangement is configured to operate the steering actuating drive to prevent an actual steering angle from coinciding with one of the collision steering angles.

3. The steering system according claim 1, wherein countersteering apparatus is operatively associated with the steering handle so that the steering handle is subjectable to a countersteering force which counteracts the steering force exerted on the steering handle by the vehicle driver.

4. The steering system according to claim 3, wherein the countersteering apparatus comprises a brake operatively coupled to the steering handle.

5. The steering system according to claim 3, wherein the countersteering apparatus comprises an electric motor operatively coupled to the steering handle.

6. The steering system according to claim 5, wherein the countersteering apparatus comprises a brake operatively coupled to the steering handle.

7. The steering system according to claim 3, wherein a manual-force controller associated with the regulating and control arrangement is configured to simulate lateral forces acting on the steerable wheels and is coupled to the steering handle to transmit reduced simulated wheel forces thereto, with the manual-force controller serving as countersteering apparatus for generating the countersteering forces.

8. The steering system according to claim 3, wherein the countersteering apparatus constitutes haptic means for generating haptic signals on the steering handle.

9. The steering system according to claim 1, wherein acoustic means is operatively associated with the regulating and control arrangement to generate an acoustic signal for the vehicle driver in response to an attempt to set a steering angle coinciding with a collision steering angle.

10. The steering system according to claim 1, wherein optical means is operatively associated with the regulating and control arrangement to generate an optical signal for the second vehicle driver of the endangered car driving parallel to the first car.

11. The steering system according to claim 1, wherein optical means is operatively associated with the regulating and control arrangement to generate an optical signal for the vehicle driver in response to an attempt to set a steering angle coinciding with a collision steering angle.

12. The steering system according to claim 11, wherein the haptic means is configured to generate a signal in the form of an oscillation or vibration which is generated on the steering handle.

13. The steering system according to claim 1, wherein haptic means is operatively associated with the regulating and control arrangement to generate a haptic signal for the vehicle driver in response to an attempt to set a steering angle coinciding with a collision steering angle.

14. The steering system according to claim 13, wherein the regulating and control arrangement is configured to filter the vibration or oscillation acting on the steering handle out of the steering forces exerted thereon by the vehicle driver the vibration or oscillation to the desired steering angle.

15. The steering system according to claim 14, wherein the countersteering apparatus constitutes the haptic means for generating haptic signals on the steering handle.

16. The steering system according to claim 15, wherein the regulating and control arrangement is configured to carry out the steering action independently of the desired steering angle as a function of the driving state of the vehicle, and means for detecting the current driving state is operatively associated with the regulatory and control arrangement.

17. The steering system according to claim 1, wherein the steering actuating drive is so configured that, when the actual steering angle coincides with one of the collision steering angles, the regulating and control arrangement is caused to carry out a steering action for setting a steering angle not coinciding with one of the collision steering angles, this steering action being capable of taking place independently of the desired steering angle.

18. The steering system according to claim 1, wherein the regulating and control arrangement is configured to carry out at least one of a braking action, an engine action, a gearing action and a suspension action as a function of the current driving state of the vehicle.

* * * * *